US008713632B2

(12) United States Patent
Koeda

(10) Patent No.: US 8,713,632 B2
(45) Date of Patent: *Apr. 29, 2014

(54) METHOD FOR RESTRICTING THE USE OF AN APPLICATION PROGRAM, SYSTEM FOR AUTHENTICATING THE USER OF A MEASURING APPARATUS, AUTHENTICATION SERVER, CLIENT APPARATUS AND STORAGE MEDIUM

(75) Inventor: Noriaki Koeda, Kobe (JP)

(73) Assignee: Sysmex Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,494

(22) Filed: Nov. 18, 2011

(65) Prior Publication Data

US 2012/0096545 A1 Apr. 19, 2012

Related U.S. Application Data

(63) Continuation of application No. 11/239,574, filed on Sep. 29, 2005, now Pat. No. 8,087,062.

(30) Foreign Application Priority Data

Sep. 29, 2004 (JP) ................................ 2004-285275

(51) Int. Cl.
*H04L 29/06* (2006.01)

(52) U.S. Cl.
USPC ..................... 726/2; 726/18; 726/19; 713/170

(58) Field of Classification Search
USPC ............................................................ 726/2
See application file for complete search history.

(56) References Cited

U.S. PATENT DOCUMENTS

| 5,550,968 | A | 8/1996 | Miller et al. |
| 5,604,490 | A | 2/1997 | Blakley, III et al. |
| 5,818,936 | A | 10/1998 | Mashayekhi |
| 6,656,119 | B2 | 12/2003 | Sasaki et al. |
| 6,804,753 | B1 | 10/2004 | Moody, II et al. |
| 6,922,843 | B1 | 7/2005 | Herrington et al. |
| 6,971,001 | B1 | 11/2005 | Rolfs |
| 7,392,391 | B2 * | 6/2008 | Eibach et al. .................. 713/175 |
| 7,483,984 | B1 * | 1/2009 | Jonker et al. .................. 709/226 |
| 7,657,531 | B2 * | 2/2010 | Bisbee et al. .................. 713/182 |
| 2003/0086111 | A1 | 5/2003 | Akiyoshi |
| 2003/0212806 | A1 | 11/2003 | Mowers et al. |
| 2004/0258429 | A1 | 12/2004 | Moroi |
| 2005/0086447 | A1 | 4/2005 | Miyamoto et al. |

FOREIGN PATENT DOCUMENTS

| JP | 2000-172646 A | 6/2000 |
| JP | 2004-213537 A | 7/2004 |

* cited by examiner

*Primary Examiner* — Mohammad L Rahman
(74) *Attorney, Agent, or Firm* — Brinks Gilson & Lione

(57) ABSTRACT

A user authentication system is provided with a client apparatus and an authentication server. An application program used for processing the measurement results of the measuring apparatus is installed on the client apparatus. Databases for storing use authority information of the application program are provided on the authentication server. A user inputs authentication information when operating the client apparatus and the application program is started. The client apparatus sends the authentication information to the authentication server, and an authentication process is performed by the authentication server. When authentication is successful, the use authority information of this user is sent from the authentication server to the client apparatus, and the client apparatus sets the application use restrictions according to the use authority information.

8 Claims, 18 Drawing Sheets

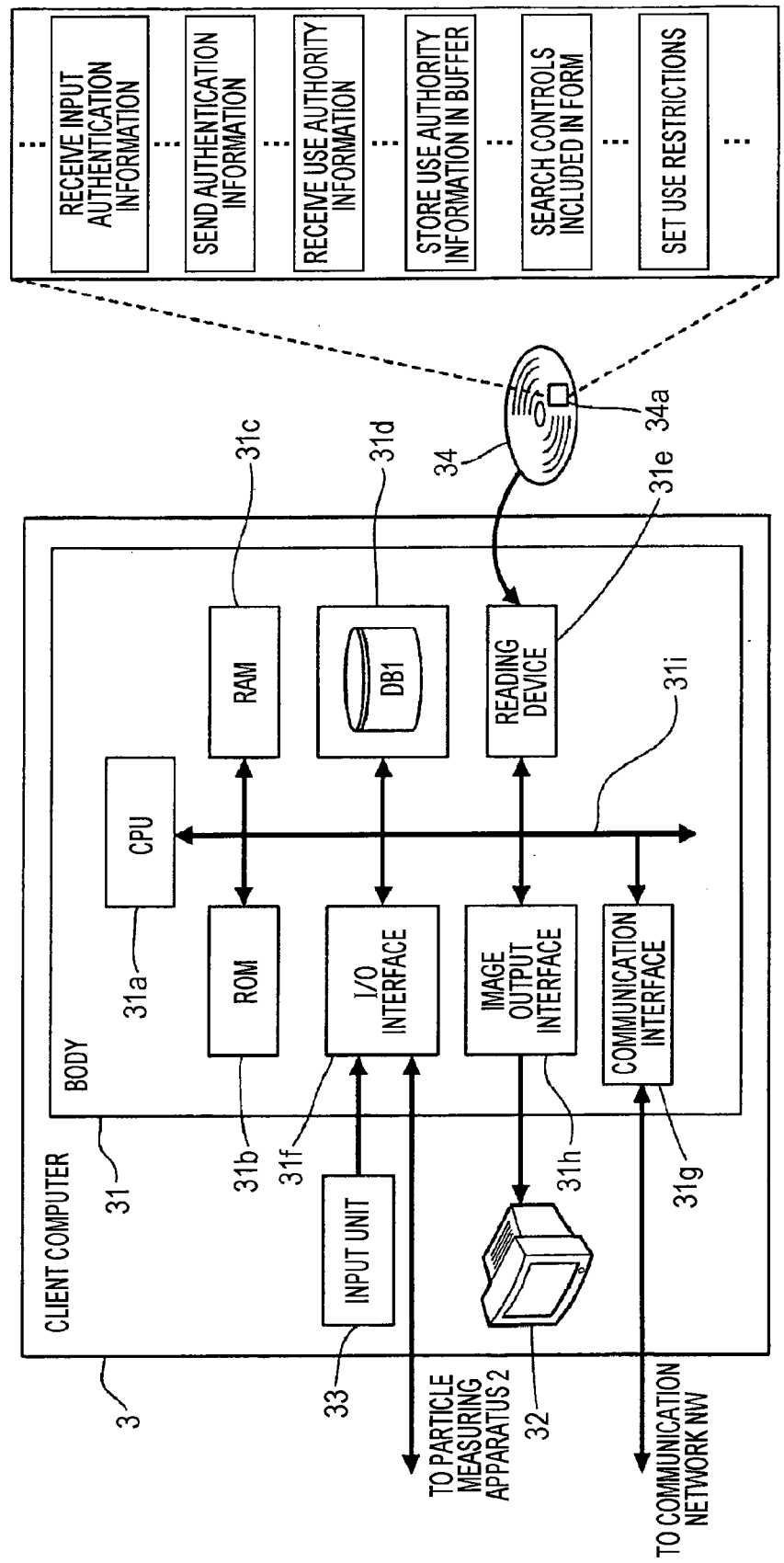

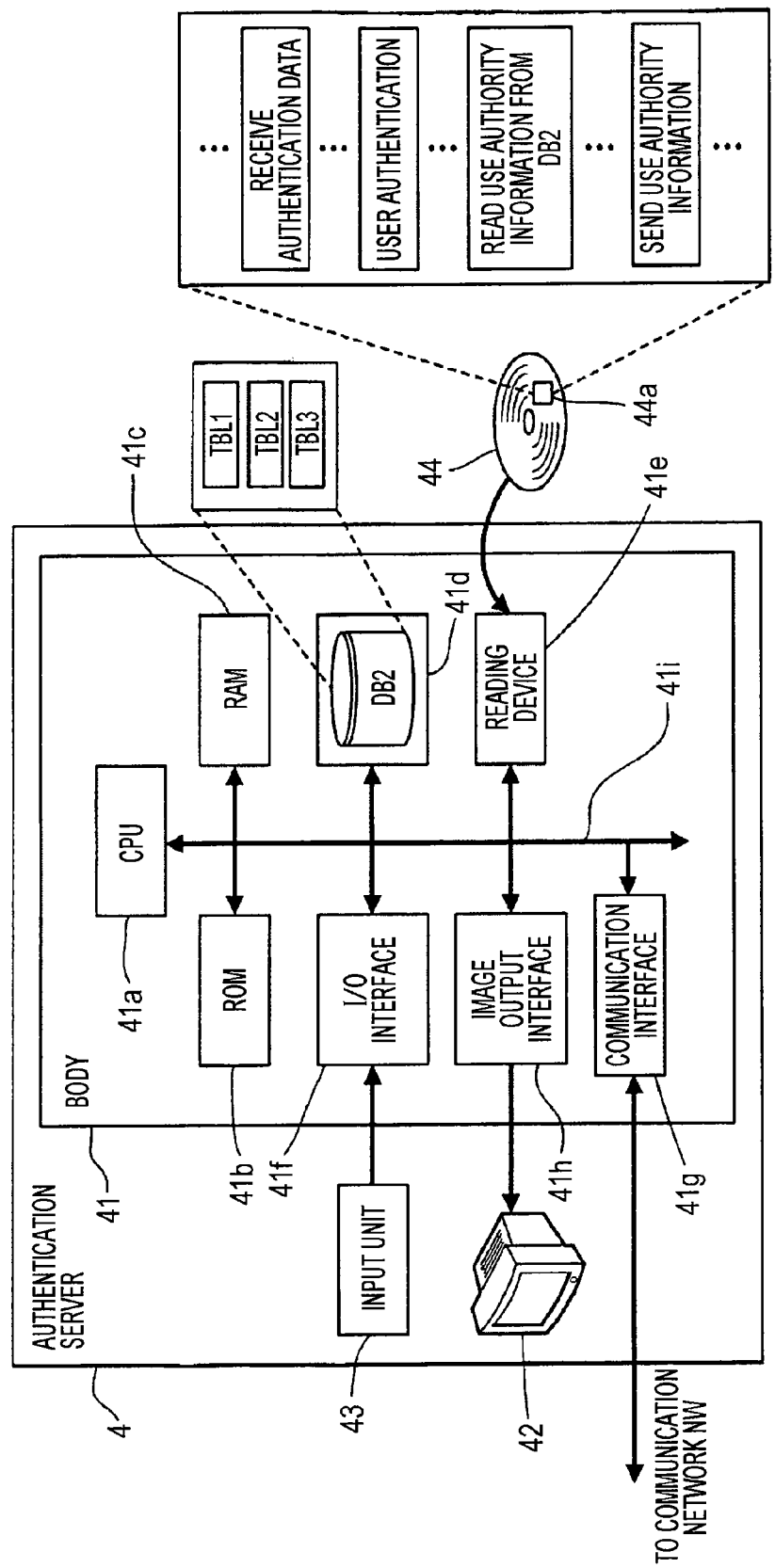

FIG. 7

TBL1

| F11 USER ID | F12 LOGON ID | F13 USER NAME | F14 USER GROUP | F15 PASSWORD | F16 DATABASE | F17 ACCOUNT VALIDITY | F18 RECORD DATE | F19 EXPIRATION DATE | F110 CHANGE DATE | F111 RECORDER | F112 DESCRIPTION |
|---|---|---|---|---|---|---|---|---|---|---|---|
| 1 | developer | DEVELOPER | Developer | abcdefg | db¥sample.rbk | Enable | 2004/10/01 | | | system | FIRST RECORD |
| 2 | production | PRODUCTION | Production | 000000 | db¥sample.rbk | Enable | 2004/10/01 | | | system | FIRST RECORD |
| 3 | mentenance | MAINTENANCE | Mentenance | 111111 | db¥sample.rbk | Enable | 2004/10/01 | | | system | FIRST RECORD |
| 4 | Administrator | Supervisor | UserAdmin | 22222 | db¥sample.rbk | Enable | 2004/10/01 | | | system | FIRST RECORD |
| 5 | manager | MANAGER | Manager | aaaaa | db¥sample.rbk | Enable | 2004/10/01 | | | system | TEST USER |
| 6 | operator | OPERATOR | Operator | bbbbb | db¥sample.rbk | Enable | 2004/10/01 | | | system | TEST USER |
| 7 | tokkyo | TOKKYO | User Admin | jitsuyou | db¥db1.rbk | Enable | 2004/10/02 | 2004/12/31 | | Supervisor | |
| 8 | taro | TARO | Operator | taro | db¥db2.rbk | Enable | 2004/10/02 | 2005/10/02 | | Supervisor | |
| 9 | hanako | HANAKO | Operator | ccccc | db¥db3.rbk | Enable | 2004/10/02 | 2005/03/31 | | Supervisor | |
| 10 | 444 | 444 | Operator | 444 | db¥db4.rbk | Disable | 2004/10/02 | | 2004/10/03 | TOKKYO | 444 |
| 11 | 555 | 555 | Operator | 555 | db¥db5.rbk | Enable | 2004/10/02 | | 2004/10/05 | TARO | |
| 12 | 88888 | 88888 | Operator | 88888 | db¥db6.rbk | Enable | 2004/10/02 | | | TARO | |

FIG. 8

TBL2

| USER GROUP ID F21 | USER GROUP NAME F22 | USER GROUP DISPLAY NAME F23 | AUTHORITY ID F24 | VALIDITY F25 | RECORDER F26 | RECORD DATE F27 | DESCRIPTION F28 |
|---|---|---|---|---|---|---|---|
| 1 | Developer | DEVELOPER | 1 | Yes | system | 2004/10/01 | INITIAL RECORD |
| 2 | Production | PRODUCTION | 2 | Yes | system | 2004/10/01 | INITIAL RECORD |
| 3 | Mentenance | MAINTENANCE | 3 | Yes | system | 2004/10/01 | INITIAL RECORD |
| 4 | User Admin | Supervisor | 4 | Yes | system | 2004/10/01 | INITIAL RECORD |
| 5 | Manager | MANAGER | 5 | Yes | system | 2004/10/01 | INITIAL RECORD |
| 6 | Operator | OPERATOR | 6 | Yes | system | 2004/10/01 | INITIAL RECORD |
| 7 | User1 | USER1 | 7 | Yes | | | |
| 8 | User2 | USER2 | 8 | Yes | | | |
| 9 | User3 | USER3 | 9 | No | | | |
| 10 | User4 | USER4 | 10 | No | | | |
| 11 | User5 | USER5 | 11 | No | | | |
| 12 | User6 | USER6 | 12 | No | | | |

FIG. 9

TBL3

| F31 DISPLAY NAME | F32 FORM NAME | F33 CONTROL NAME | F34 Developer | F35 Production | Maintenance | F36 User Admin | F37 Manager | F38 Operator | F39 User1 | F310 User2 | F311 |
|---|---|---|---|---|---|---|---|---|---|---|---|
| MENU SUMMARY: FILE | frmMain | mnuFile | Enable | Enable | Enable | Enable | Enable | Enable | Enable | Enable | |
| FILE MENU: NEW | frmMain | mnuRBK | Enable | Enable | Enable | Enable | Enable | Disable | Disable | Disable | |
| FILE MENU: OPEN | frmMain | mnuFileOpen | Enable | Enable | Enable | Enable | Enable | Enable | Enable | Enable | |
| FILE MENU: EXTERNAL SAVE-ALL RECORDS | frmMain | mnuAllData | Enable | Enable | Enable | Enable | Enable | Disable | Disable | Disable | |
| FILE MENU: EXTERNAL SAVE-SELECTED RECORDS | frmMain | mnuFileSaveAs | Enable | Enable | Enable | Enable | Enable | Disable | Disable | Disable | |
| FILE MENU: PRINT | frmMain | mnuFilePrint | Enable | Enable | Enable | Enable | Enable | Disable | Disable | Disable | |
| PRINT: LIST CHECKBOX | DlgPrintOut | Check1 | Enable | Enable | Enable | Enable | Enable | Disable | Disable | Disable | |
| PRINT: ANALYSIS RESULT CHECKBOX | DlgPrintOut | Check2 | Enable | Enable | Enable | Enable | Enable | Disable | Disable | Disable | |
| PRINT: GRAPH (TREND) CHECKBOX | DlgPrintOut | Check6 | Enable | Enable | Enable | Enable | Enable | Disable | Disable | Disable | |
| PRINT: SCATTER (TREND) CHECKBOX | DlgPrintOut | Check10 | Enable | Enable | Enable | Enable | Enable | Disable | Disable | Disable | |
| PRINT: GRAPH (OVERLAY) CHECKBOX | DlgPrintOut | Check7 | Enable | Enable | Enable | Enable | Enable | Disable | Disable | Disable | |
| PRINT: ORIGINAL DOCUMENT CHECKBOX | DlgPrintOut | Check8 | Enable | Enable | Enable | Enable | Enable | Disable | Disable | Disable | |
| PRINT: DIAMETER FREQUENCY CHECKBOX | DlgPrintOut | Check3 | Enable | Enable | Enable | Enable | Enable | Disable | Disable | Disable | |
| PRINT: SHAPE FREQUENCY CHECKBOX | DlgPrintOut | Check4 | Enable | Enable | Enable | Enable | Enable | Disable | Disable | Disable | |
| PRINT: SCATTER DATA CHECKBOX | DlgPrintOut | Check5 | Enable | Enable | Enable | Enable | Enable | Disable | Disable | Disable | |
| PRINT: IMAGE DATA CHECKBOX | DlgPrintOut | Check9 | Enable | Enable | Enable | Enable | Enable | Disable | Disable | Disable | |
| PRINT: FORMAT SET BUTTON | DlgPrintOut | CmdFormat | Enable | Enable | Enable | Enable | Enable | Disable | Disable | Disable | |
| PRINT: OUTPUT ALL OPTION | DlgPrintOut | Option3 | Enable | Enable | Enable | Enable | Enable | Disable | Disable | Disable | |
| PRINT: OUTPUT MARKED DATA OPTION | DlgPrintOut | Option4 | Enable | Enable | Enable | Enable | Enable | Disable | Disable | Disable | |

FIG. 13

| | MEASUREMENT DATE | REAGENT GROUP NAME | MODE | TECH NAME | MODE DIAMETER | 50% DIAMETER | PARTICLE DIAMETER (SD) | Upper DIAMETER |
|---|---|---|---|---|---|---|---|---|
| 1 | 2004/10/03 13:00:00 | TONER | 1 | Supervisor | -8.421505E+08 | -8.421505E+08 | -8.421505E+08 | -8.421505E+08 |
| 2 | 2004/10/03 13:31:56 | TONER | 1 | Supervisor | -8.421505E+08 | -8.421505E+08 | -8.421505E+08 | -8.421505E+08 |
| 3 | 2004/10/03 13:38:00 | TONER | 1 | Supervisor | -8.421505E+08 | -8.421505E+08 | -8.421505E+08 | -8.421505E+08 |
| 4 | 2004/10/03 13:45:50 | TONER | 1 | Supervisor | -8.421505E+08 | -8.421505E+08 | -8.421505E+08 | -8.421505E+08 |
| 5 | 2004/10/03 14:30:00 | TONER | 1 | Supervisor | -8.421505E+08 | -8.421505E+08 | -8.421505E+08 | -8.421505E+08 |
| 6 | 2004/10/03 15:00:00 | TONER | 1 | Supervisor | -8.421505E+08 | -8.421505E+08 | -8.421505E+08 | -8.421505E+08 |
| 7 | 2004/10/03 16:00:00 | TONER | 1 | Supervisor | -8.421505E+08 | -8.421505E+08 | -8.421505E+08 | -8.421505E+08 |

FIG. 17

| GROUP NAME | VALIDITY | RECORDER | CHANGE DATE | DESCRIPTION |
|---|---|---|---|---|
| MANAGER | ☑ | System | 2004/10/01 | FIRST RECORD |
| OPERATOR | ☑ | System | 2004/10/01 | FIRST RECORD |
| 111 | ☑ | | | |
| 222 | ☑ | | | |
| USER3 | ☐ | | | |
| USER4 | ☐ | | | |
| USER5 | ☐ | | | |
| USER6 | ☐ | | | |
| USER7 | ☐ | | | |
| USER8 | ☐ | | | |
| USER9 | ☐ | | | |
| USER10 | ☐ | | | |

USER INFORMATION | PASSWORD/ACCOUNT | GROUP SETTING

GROUP LIST

ACCESS PERMISSION LIST

| ID | ACTION | VALIDITY |
|---|---|---|
| 1 | SOP RECORD ERASE | ☑ |
| 2 | MEASUREMENT WITHOUT SOP | ☐ |
| 3 | SAMPLE INFO INPUT | ☐ |
| 4 | FLOW UNIT SELECTION/CONFIRM CONNECTION | ☐ |
| 5 | OBJECTIVE LENS UNIT/CONFIRM CONNECTION | ☐ |
| 6 | EXECUTE DISPERSION MEDIUM EXCHANGE SEQUENCE | ☐ |
| 7 | SELECT DISPERSION MEDIUM,RECORD NAME | ☐ |
| 8 | SPECIFY SHEATH CONDITIONS | ☐ |
| 9 | SPECIFY MIX CONDITIONS | ☐ |
| 10 | SET ULTRASONIC DISPERSION CONDITIONS | ☐ |
| 11 | INPUT AUTO FOCUS OFFSET VALUE | ☐ |
| 12 | AUTO CALIBRATION WIZARD | ☐ |
| 13 | INPUT HPF, LPF FREQUENCY CORRECTION PARAMETERS | ☐ |
| 14 | INPUT HPF, LPF ROUNDNESS CORRECTION PARAMETERS | ☐ |
| 15 | INPUT HPF, LPF DENSITY CORRECTION PARAMETERS | ☐ |

EDIT

USER GROUP: Manager

GROUP NAME: [MANAGER]

GROUP VALIDITY
- ⦿ VALID
- ○ INVALID

| ID | ACTION | VALIDITY |
|----|--------|----------|
| 1 | SOP RECORD ERASE | ☑ |
| 2 | MEASUREMENT WITHOUT SOP | ☐ |
| 3 | SAMPLE INFO INPUT | ☐ |
| 4 | FLOW UNIT SELECTION/CONFIRM CONNECTION | ☐ |
| 5 | OBJECTIVE LENS UNIT/CONFIRM CONNECTION | ☐ |
| 6 | EXECUTE DISPERSION MEDIUM EXCHANGE SEQUENCE | ☐ |
| 7 | SELECT DISPERSION MEDIUM, RECORD NAME | ☐ |
| 8 | SPECIFY SHEATH CONDITIONS | ☐ |
| 9 | SPECIFY MIX CONDITIONS | ☐ |
| 10 | SET ULTRASONIC DISPERSION CONDITIONS | ☐ |
| 11 | INPUT AUTO FOCUS OFFSET VALUE | ☐ |
| 12 | AUTO CALIBRATION WIZARD | ☐ |
| 13 | INPUT HPF, LPF FREQUENCY CORRECTION PARAMETERS | ☐ |
| 14 | INPUT HPF, LPF ROUNDNESS CORRECTION PARAMETERS | ☐ |
| 15 | INPUT HPF, LPF DENSITY CORRECTION PARAMETERS | ☐ |
| 16 | SWITCH LINEAR CORRECTION ON/OFF, SET TABLES | ☑ |
| 17 | PRINT CALIBRATION DATA | ☑ |
| 18 | SAVE CALIBRATION DATA | ☑ |
| 19 | REAL-TIME DISPLAY OF IMAGE ON SCREEN | ☑ |
| 20 | APPARATUS STATUS DISPLAY | ☑ |
| 21 | DISPLAY HYDRAULIC MECHANISM CHECK SCREEN | ☐ |
| 22 | ERROR CONDITION DISPLAY | ☑ |
| 23 | ERROR RECOVERY | ☑ |
| 24 | ERROR HISTORY DISPLAY, PRINT | ☑ |

[OK] [CANCEL]

METHOD FOR RESTRICTING THE USE OF AN APPLICATION PROGRAM, SYSTEM FOR AUTHENTICATING THE USER OF A MEASURING APPARATUS, AUTHENTICATION SERVER, CLIENT APPARATUS AND STORAGE MEDIUM

PRIORITY

This application is a continuation of U.S. application Ser. No. 11/239,574, filed Sep. 29, 2005, which claims priority under 35 U.S.C. §119 to Japanese Patent Application No. 2004-285275 filed Sep. 29, 2004. The entire content of U.S. application Ser. No. 11/239,574 and Japanese Patent Application No. 2004-285275 are hereby incorporated by reference.

BACKGROUND OF THE INVENTION

1. Field of the Invention

The present invention relates to a method for restricting the use of an application program used to process the measurement results of a measuring apparatus, system for authenticating the user of a measuring apparatus, authentication server, and client apparatus and computer readable storage medium stored an application program that allows a computer to function as a client apparatus.

2. Description of the Related Arts

There are well-known methods for restricting the use of an application program in which, when a user has been successfully authenticated, the user is restricted to using only those functions of the application program for which the user has been authenticated. A method for restricting the use of an application program has been proposed wherein, when an application (Java applets) including a plurality of functions is provided from a WWW server and operates in a WWW browser, the WWW server returns usage authority information of the plurality of functions to the WWW browser in response to a request from the application program, and the WWW browser checks the usage authority information and automatically changes the function usability (refer to Japanese Laid-Open Patent Publication No. 2000-172646).

Furthermore, a method has been proposed wherein access to an object is permitted when there is an access request from a client over a communication network to an object on a server, and a determination as to whether or not the user of the client has authority to access the object results in the user having access authority (US Patent Application Publication No. US2003/0212806).

Measuring apparatuses are known which measure the quantities of various attributes of blood specimens, urine specimens, or particle specimens, such as blood analyzers, urine analyzers, and particle analyzers. This type of measuring apparatus typically requires very complex processing in order to analyze measurement results, and is separately provided with a computer on which are installed application programs for processing measurement results, such that computer executes these complex processes. Since the application program for processing the measurement results of the measuring apparatus has a very high functionality, when all users are permitted to use all functions, the application program or measuring apparatus settings may be carelessly changed, and important data may be deleted. Furthermore, it is important to have a plan for adequately managing users in order to ensure the safety of the measuring apparatus. Therefore, this type of conventional application program is provided with a user authentication function, and use restricting functions for each user group to which a user belongs.

In the case of the aforementioned conventional application programs used for processing the measurement results of the measuring apparatuses, since the use restriction function must be integrated into the application program, when the functions of restricted use are changed for a particular user group and when a new user group is recorded, the program codes must be changed for the functions of the use restriction function, thus requiring very complex labor. Furthermore, these changes cannot be performed by technicians who have detailed knowledge of the application program source code, and cannot be changed by the user supervisor.

Since such application programs have very high functionality, the server processing load is increased greatly and there is a large increase in communication data in structures such as thin client systems and the like that provide the functions of an application program from a server to a client over a communication network, such that the application program must be installed on a computer used by the user. However, Japanese Laid-Open Patent Publication No. 2000-172646 and US Patent Application Publication No. US2003/0212806 only disclose methods that provide the functions of an application program from a server to a client, and these methods are not applicable to restricting the use of functions of an application program used for processing the measurement results of measuring apparatus.

SUMMARY OF THE INVENTION

The scope of the present invention is defined solely by the appended claims, and is not affected to any degree by the statements within this summary.

In view of the aforesaid information, an object of the present invention is to provide a method for restricting the use of an application program capable of easily changing, in comparison to conventional methods, the restrictions on use of functions of the application program used to process the measurement results of a measuring apparatus, system for authenticating users of the measuring apparatus employing this method, authentication server, client apparatus, and computer readable storage medium stored an application program that enables a computer to function as a client apparatus.

The first aspect of the present invention relates to a method for restricting the use of an application program used for processing measurement results of a measuring apparatus, comprising the steps of receiving input of authentication information used to authenticate a user, authenticating user based on the received authentication information, acquiring use authority information related to the authenticated user from a database that stores use authority information that indicates authority to use objects configuring the application program, and setting use restrictions of the application program for the authenticated user based on the acquired use authority information.

The second aspect of the present invention relates to a system for authenticating users of a measuring apparatus comprising a database for storing use authority information that indicates use authority of objects configuring an application program used for processing the measurement results of the measuring apparatus, an input unit for receiving input of authentication information used to authenticate a user from a user, an authentication means for authenticating the user based on the authentication information received by the input unit, a use authority information acquiring means for acquiring use authority information of a user who has been successfully authenticated by the authentication means from the database, and a use restriction setting means for setting restrictions on the use of the application program by the user based on the use authority information acquired by the use authority information acquiring means.

The third aspect of the present invention relates to an authentication server for authenticating a user who has use authority of an application program used for processing measurement results of a measuring apparatus comprising a database for storing use authority information that indicates use authority of objects configuring the application program, an authentication request receiving means for receiving a request for user authentication by receiving user authentication information, an authentication means for authenticating a user based on the user authentication information received by the authentication request receiving means, a use authority information reading means for reading the use authority information of a user who has been successfully authenticated by the authentication means from the database, and a use authority information sending means for sending the use authority information read by the use authority information reading means to the source requesting user authentication.

The fourth aspect of the present invention relates to a client apparatus on which an application program used for processing measurement results of a measuring apparatus is installed comprising an input unit for receiving input of authentication information used to authenticate a user from a user, a sending means for sending the authentication information received by the input unit to an authentication server, a receiving means for receiving use authority information of a user who has been successfully authenticated by the authentication server from the authentication server, and a use restriction setting means for setting use restrictions of the application program based on the use authority information received by the receiving means.

The fifth aspect of the present invention relates to a computer readable storage medium stored an application program used for processing measurement results of a measuring apparatus, wherein the application program comprises an input receiving means, in a computer, for receiving input of authentication information, a sending means, in a computer, for sending the authentication information received by the input receiving means to an authentication server, a receiving means, in a computer, for receiving use authority information of a user who has been successfully authenticated by the authentication server from the authentication server, and a use restriction setting means, in a computer, for setting use restrictions on the use of the application program based on the use authority information received by the receiving means.

BRIEF DESCRIPTION OF THE DRAWINGS

FIG. 5 is a block diagram showing the structure of a client computer of an embodiment of the present invention;

FIG. 6 is a block diagram showing the structure of an authentication server of an embodiment of the present invention;

FIG. 7 is a conceptual drawing showing the structure of a user account table of an embodiment of the present invention;

FIG. 8 is a conceptual drawing showing the structure of a user account table of an embodiment of the present invention;

FIG. 9 is a conceptual drawing showing the structure of a use authority table of an embodiment of the present invention;

FIG. 13 shows an example of a main window;

FIG. 17 shows an example of the user authentication setting window; and

FIG. 18 shows an example of the user group setting window.

DESCRIPTION OF THE PREFERRED EMBODIMENTS

The embodiments of the present invention are described hereinafter based on the drawings.

Figure 1:
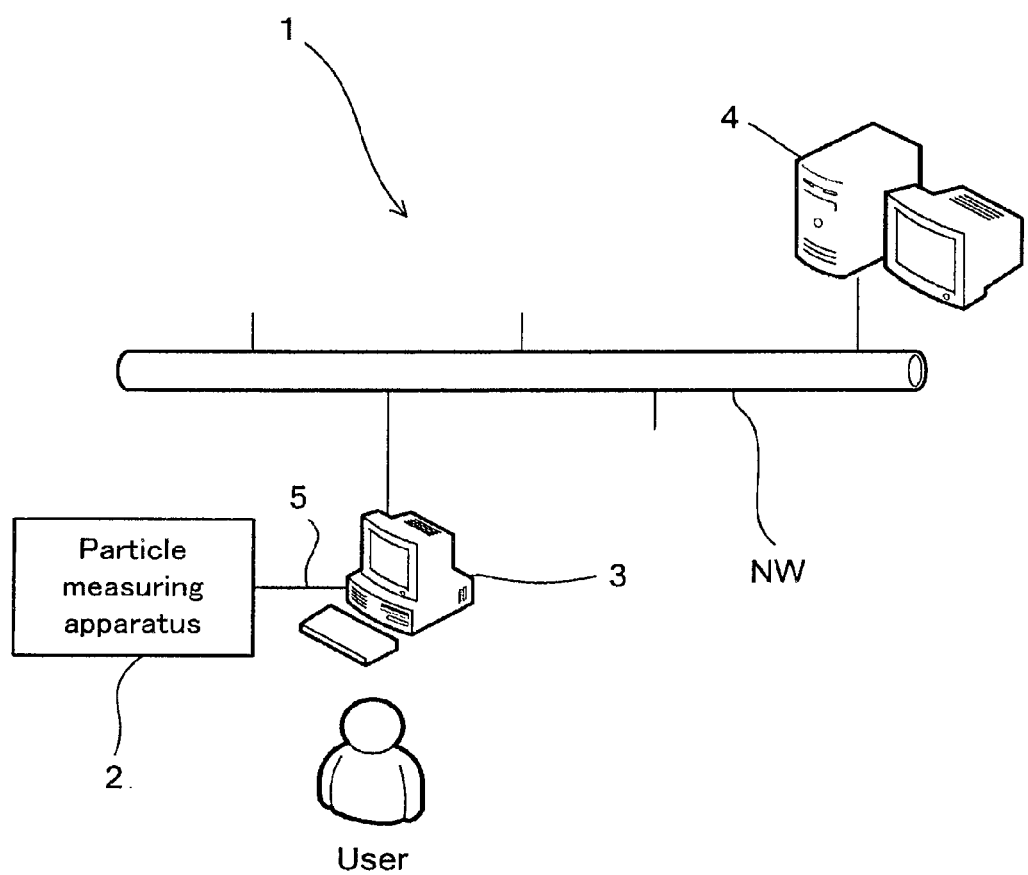
FIG. 1 is a schematic view showing the structure of an embodiment of the user authentication system of the present invention.

FIG. 1 is a schematic view showing the structure of an embodiment of the user authentication system of and embodiment of the present invention. As shown in FIG. 1, the user authentication system 1 of the present embodiment mainly includes a particle measuring apparatus 2, client computer 3, and authentication server 4. The user authentication system 1 is generally installed within a business facility where particles are measured, research facility, hospital, or pathology laboratory or the like. The particle measuring apparatus 2 and client computer 3 are connected by means of an electrical signal cable 5 so as to be capable of mutual data communication.

Figure 2:
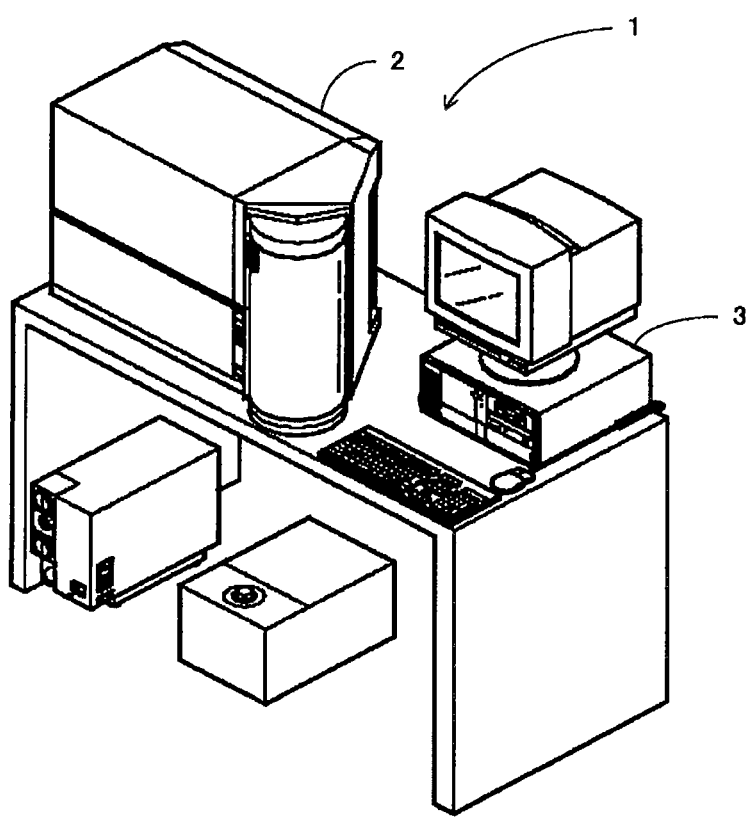
FIG. 2 is a perspective view showing the structure of an embodiment of the particle measuring apparatus and client computer of the present invention.

FIG. 2 is a perspective view showing the structure of an embodiment of the particle measuring apparatus and client computer of the embodiment of the present invention. The particle measuring apparatus 2 of the present embodiment captures a particle image, generates a partial image that includes an image of a particle from the particle image, and transmits this partial image to the client computer 3. An application program 34a described later is installed on the client computer 3, and required processing, such as image processing and analysis processing and the like of the received partial image is executed by the application program 34a.

Figure 3:
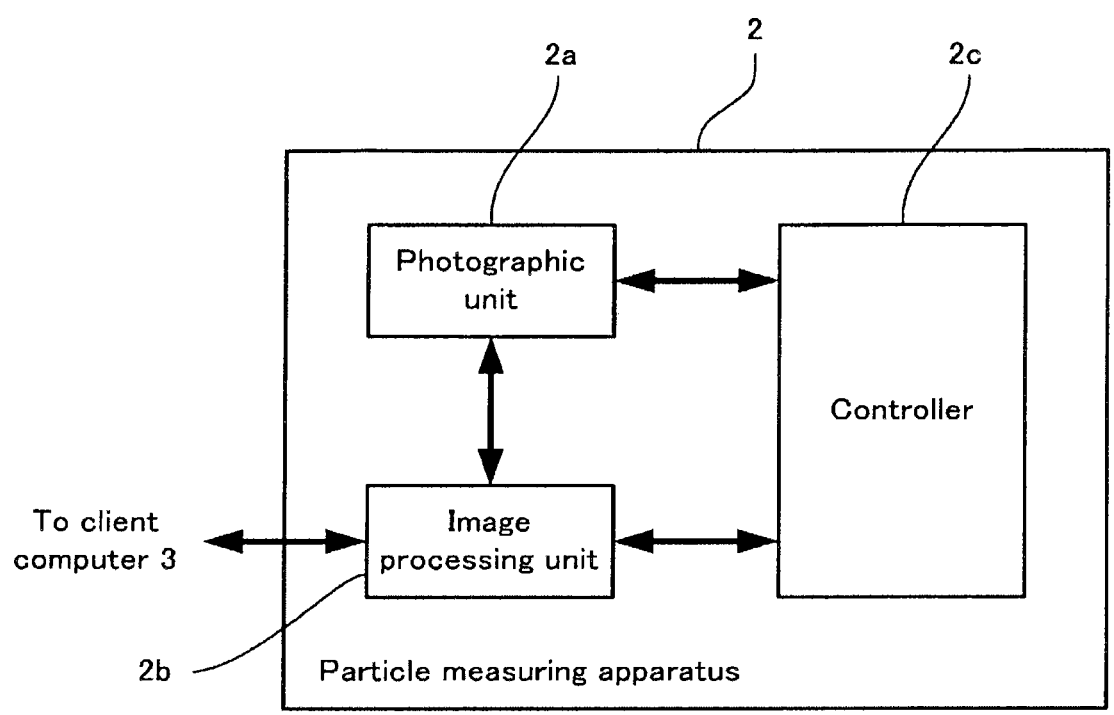
FIG. 3 is a block diagram showing the structure of an embodiment of the particle measuring apparatus of the present invention.
Figure 4:
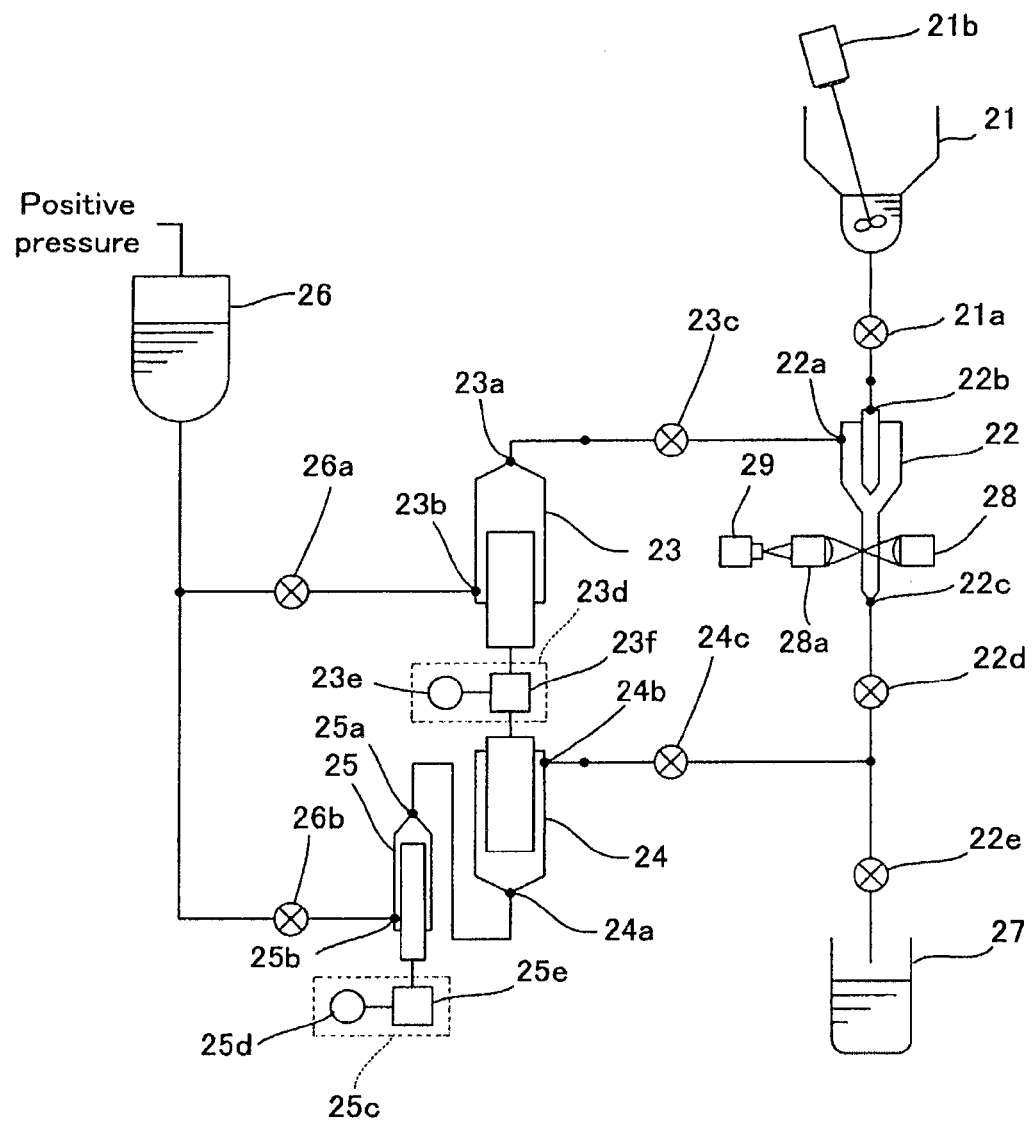
FIG. 4 is a schematic view showing the structure of an photographic unit provided in a particle measuring apparatus of an embodiment of the present invention.

FIG. 3 is a block diagram showing the structure of an embodiment of the particle measuring apparatus of an embodiment of the present invention, and FIG. 4 is a schematic view showing the structure of a photographic unit 2a provided in the particle measuring apparatus 2 of the embodiment of the present invention. As shown in FIG. 3, the particle measuring apparatus 2 mainly includes the photographic unit 2a, an image processor 2b, and a controller 2c.

As shown in FIG. 4, the photographic unit 2a mainly includes a sample fluid container 21, sheath flow cell 22, syringe pumps 23, 24, 25, sheath fluid container 26, discharge fluid container 27, strobe lamp 28, and video camera 29, such that particle suspension fluid is supplied from the sample fluid container 21 to the sheath flow cell 22, and this particle suspension fluid is encapsulated in the sheath fluid provided to the sheath flow cell 22 so as to form a flat suspension flow, and the particles contained in the suspension flow are photographed by the video camera 29.

The structure of the photographic unit 2a is described below. As shown in FIG. 3, the sheath flow cell 22 has a sheath fluid inlet 22a, sample fluid inlet 22b, and outlet 22c for discharging the mixture of the sheath and sample fluids. The sample fluid container 21 is open at the top so as to be capable of storing sample fluid within, and an outlet is provided in the bottom. The outlet of the sample fluid container 21 is connected to the sample fluid inlet 22b through a flow path. An electromagnetic valve (hereinafter referred to as "valve") 21a is provided in the flow path between the sample fluid inlet 22b and the outlet of the sample fluid container 21. Furthermore, a mixing device 21b is provided to mix the sample fluid within the sample fluid container 21. The sample fluid is a particle suspension fluid that contains particles.

The syringe pump 23 has a discharge port 23a, and sheath fluid supply port 23b. The discharge port 23a is connected to the sheath fluid inlet 22a of the sheath flow cell 22 through a flow path. A valve 23c is provided in the flow path between the discharge port 23a and the sheath fluid supply port 22a. The sheath fluid container 26 is capable of storing sheath fluid therein, and is provided with an outlet at the bottom of the container. The outlet of the sheath fluid container 26 is connected to the sheath fluid supply port 23b through a flow path. A valve 26a is provided in the flow path between the sheath fluid supply port 23b and the outlet of the sheath fluid container 26.

The syringe pump 24 has two discharge outlets 24a and suction ports 24b, and the syringe pump 25 has two suction ports 25a sheath fluid supply port 25b. The discharge port 24a of the syringe pump 24 is connected to the suction port 25a of the syringe pump 25 through a flow path.

The outlet 22c of the sheath flow cell 22 is connected to the suction port 24b of the syringe pump 24 through a flow path, and this flow path branches from an intermediate location such that the end of the branch is connected to the opening at the top of the discharge fluid container 27. A valve 22d is provided in the flow path in the section between the outlet 22c and the branch point of the flow path, and a valve 24c is provided in the flow path in the section between the branch point and the suction port 24b. Furthermore, a valve 22e is provided in the flow path in the section between the branch point and the opening of the discharge fluid container 27.

The sheath fluid supply port 25b of the syringe pump 25 is connected to the outlet of the sheath fluid container 26 through a flow path. A valve 26b is provided in the flow path between the sheath fluid supply port 25b and the outlet of the sheath fluid container 26.

The syringe pumps 23 and 24 driven are in linkage by a single first drive source 23d, and the syringe pump 25 is driven by a second drive source 25c. The first drive source 23d is provided with a stepping motor 23e, and a transmission mechanism 23f to convert the rotational movement of the stepping motor 23e to linear movement that is transmitted the syringe pumps 23 and 24. The transmission mechanism 23f is configured by a drive pulley provided on the drive shaft of the stepping motor 23e, and a driven pulley on which a timing belt is reeved, so as to convert the rotational movement of the stepping motor 23e to linear movement.

The second drive source 25c is provided with a stepping motor 25d, and a transmission mechanism 25e to convert the rotational movement of the stepping motor 25d to linear movement that is transmitted to the syringe pump 25. The transmission mechanism 23e is configured by a drive pulley provided on the drive shaft of the stepping motor 25d, and a driven pulley on which a timing belt is reeved, so as to convert the rotational movement of the stepping motor 25d to linear movement. A mixing device 21b is inserted in the sample container 21 from the open top, so as to mix the sample fluid stored in the container 21.

Furthermore, the sheath flow cell 22 is provided with a strobe lamp 28 for illuminating the narrowly constructed sample flow encapsulated in sheath fluid, objective lens 28a for photographing the particles in the sample flow, and a video camera 29.

The image processor 2b is provided with a CPU, ROM, RAM, and image processor and the like, and is connected to the photographic unit 2a by an electrical signal cable as shown in FIG. 3. The image processor 2b captures a particle image from the video camera 29 of the photographic unit 2a, and executes image processing of this particle image. The results of this image processing are to extract a partial image including an image of a particle included in the particle image. The image processor 2b is connected the controller 2c through an electrical signal cable. The controller 2c is provided with a CPU, ROM, RAM and the like, so as to perform all controls of the particle measuring apparatus 2 by means of the controller 2c. The image processor 2b is connected to a client computer 3 through an electrical signal cable.

The structure of the client computer 3 is described below. FIG. 5 is a block diagram showing the structure of a client computer of an embodiment of the present invention. The client computer 3 mainly includes a body 31, image display unit 32, and input unit 33. The body 31 mainly includes a CPU 31a, ROM 31b, RAM 31c, hard disk 31d, reading device 31e, input/output (I/O) interface 31f, communication interface 31g, and image output interface 31h, and the CPU 31a, ROM 31b, RAM 31c, hard disk 31d, reading device 31e, input/output (I/O) interface 31f, communication interface 31g, and image output interface 31h are connected by a bus 31i.

The CPU 31a is capable of executing the computer program stored in the ROM 31b and the computer program loaded in the RAM 31c. The client computer 3 functions as a client apparatus of the authentication server 4 when the CPU 31a executes the application program 34a described later.

The ROM 31b is configured by a mask ROM, PROM, EPROM, EEPROM or the like, and stores the computer program executed by the CPU 31a and data and the like used by the computer program.

The RAM 31c is configured by an SRAM or DRAM or the like. The RAM 31c is used when reading the computer programs stored in the ROM 31b and on the hard disk 31d. When these computer programs are executed, the RAM 31c is used as a work area for the CPU 31a.

The hard disk 31d contains installed computer programs of various kinds that are executed by the CPU 31a, such as an operating system and application programs and the like, and data used in the execution of these computer programs.

The reading apparatus 31e is configured by a floppy disk drive, CD-ROM drive, DVD-ROM drive or the like, and is capable of reading computer programs and data recorded on a portable storage medium 34. The portable storage medium 34 stores the application program 34a that provides the functions of the client apparatus, such that the client computer 3 reads the application program 34a from the portable storage medium 34, and installs the application program 34a on the hard disk 31d.

The application program 34a can not only be provided by the portable storage medium 34, it may also be provided over an electric communication line from an external apparatus connected to the client computer 3 so as to be capable of communication by means of the electric communication line (either wired connection, or wireless). For example, the application program 34a may be stored on the hard disk of a server computer connected to the internet, such that the client computer 3 can access the server computer and download the application program 34a, which can then be installed on the hard disk 31d.

Furthermore, the hard disk 31d may also have installed thereon an operating system that provides a graphical user interface environment via a window system such as Windows (registered trademark) produced by the Microsoft Corporation, or a Unix (registered trademark) operating system and an X window system that operates on the Unix operating system. In the following description, the application program 34a of the present embodiment operates on a window system.

The application program 34a receives the image processing result data obtained from the results of image processing by the particle measuring apparatus 2, executes image processing of the particle image included in the received image processing result data, and calculates the roundness and diameter (circular diameter) of each particle image. The application program 34a has the further functions of displaying the received particle images in a matrix array on the display screen, displaying the diameter and roundness of the particles of selected particle images, saving the diameter and roundness of the processing results to a database, displaying diagrams such as scattergrams and the like of predetermined analysis results and the like. Furthermore, a database DB1 for storing processing result data is provided on the hard disk 31d. This database DB1 may be a plurality of databases, which are set beforehand such that each user uses a particular database DB1 in a manner described later.

The I/O interface 31f may be configured by, for example, a serial interface such as a USB, IEEE1394, RS-232C or the like, a parallel interface such as a SCSI, IDE, IEEE1284 or the like, or an analog interface such as a D/A converter or A/D converter. The I/O interface 31f is connected to an input unit 33, which includes a keyboard and mouse, such that data can be input to the client computer 3 when a user, such as an operator, manager, user administrator, maintenance technician or the like, uses the input unit 33.

The I/O interface 31f is connected to an electrical signal cable 5, such that data can be transferred to and from the particle measuring apparatus 2 through the electrical signal cable 5.

The communication interface 31g may be, for example, an Ethernet (registered trademark) interface, such that the client computer 3 can send and receive data to and from the authentication server 4 connected to a communication network NW by using a predetermined communication protocol through the communication interface 31g.

The image output interface 31h is connected to an image display unit 32 such as an LCD, CRT or the like, such that image signals corresponding to the image data obtained from the CPU 31a can be output to the image display unit 32. The image display unit 32 displays images (screens) in accordance with the input image signals.

The structure of the authentication server 4 is described below. FIG. 6 is a block diagram showing the structure of an authentication server 4 of an embodiment of the present invention. The authentication server 4 is a computer, mainly including a body 41, image display unit 42, and input unit 43. The body 41 mainly includes a CPU 41a, ROM 41b, RAM 41c, hard disk 41d, reading device 41e, I/O interface 41f, communication interface 41g, and image output interface 41h, and the CPU 41a, ROM 41b, RAM 41c, hard disk 41d, reading device 41e, I/O 41f, communication interface 41g, and image output interface 41h are connected by a bus 41i.

The CPU 41a is capable of executing the computer program stored in the ROM 41b and the computer program loaded in the RAM 41c. The computer functions as the authentication server 4 when the CPU 41a executes an authentication server program 44a.

The ROM 41b is configured by a mask ROM, PROM, EPROM, EEPROM or the like, and stores the computer program executed by the CPU 41a and data and the like used by the computer program.

The RAM 41c is configured by an SRAM or DRAM or the like. The RAM 41c is used when reading the computer programs stored in the ROM 41b and on the hard disk 41d. When these computer programs are executed, the RAM 41c is used as a work area for the CPU 41a.

The hard disk 41d contains installed computer programs of various kinds that are executed by the CPU 41a, such as an operating system and server program 44a and the like, and data used in the execution of these computer programs.

The hard disk 41d further stores a database DB2 used for use restrictions of the application program 34a. This database DB2 is a relational database, and has a user account table TBL1, user group table TBL2, and use authority table TBL3. FIG. 7 is a conceptual drawing showing the structure of the use account table TBL1. The user account table TBL1 includes a user ID field F11 for storing user IDs specifying users, logon ID field F12 for storing logon IDs for logging on, user name field F13 for storing user names, user group field F14 for storing user groups to which users belong, password field F15 for storing passwords, default database field F16 for storing a default database DB1 used by the users, account validity field F17 for storing valid/invalid setting values of user accounts, record date field F18 for storing record dates, expiration date field F19 for storing the expiration date of passwords, change date field F110 for storing change dates, recorder field F111 for storing the names of recorders, and description field F112 for storing text describing the user. The user ID field F11 stores half-width numbers representing user IDs, and the logon ID field F12 stores strings of six to twenty half-width characters representing logon IDs. Furthermore, the user name field F13 stores half-width or full-width text (six to twenty half-width characters) representing user names, the user group field F14 one to twenty half-width characters representing user groups, the password field F15 stores strings of one to twenty half-width characters representing passwords, the default database field F16 stores half-width characters representing a path to the default database DB1, the account validity field F17 stores either one or another of two set values representing "enable" and "disable", the record date field F18 stores half-width characters representing the date of the record, the expiration date field F19 stores half-width characters representing the date of the expiration date, the change date field F110 stores half-width characters representing the date of a change, the recorder field F111 stores half-width or full-width characters (six to twenty half-width characters) representing the recorder (user name), and the description field F12 stores half-width or full-width characters of description text (0 to 40 half-width characters).

FIG. 8 is a conceptual drawing showing the structure of the user group table TBL2. The user group table TBL2 has a user group ID field F21 for storing user group IDs specifying user groups, user group name field F22 for storing user group names, user group display name field F23 for storing user group display names, use authority ID field F24 for storing use authority IDs specifying authority to use functions of the application program 34a, user group effectiveness field F25 for storing effective/ineffective setting values of user groups, recorder field F26 for storing the recorder name of the user group, Record date field F27 for storing the year-month-day the user group was recorded, and description field F28 for storing text describing the user group. The user group ID field F21 stores strings of half-width characters representing the user group IDs. Furthermore, the user group name field F22 stores a strings of one to twenty half-width characters representing the user group name, the user group display name field F23 stores strings of half-width or full-width characters representing the user group display names, the use authority ID field F24 stores one or more half-width numbers representing the use authority ID, the user group effectiveness field F25 stores one of either of two set values representing YES (=effective) and NO (=ineffective), the recorder field F26 stores strings of six to twenty half-width characters representing the recorder name, the date field F27 stores strings of half-width characters representing the record date, and the description field F28 stores strings of half-width or full-width text of a description (0 to 40 half-width characters).

FIG. 9 is a conceptual drawing showing the structure of the use authority table TBL3. The use authority table TBL3 includes a display name field F31 for storing the display names of functions, form name field F32 for storing names (form names) of the forms (windows) that include the function (control), control name field F33 for storing the names of controls (control names), and a plurality of user group fields F34 for storing the use authority of controls for each user group. The display name field F31 stores strings of half-width or full-width characters representing the display names of the functions targeted for setting use authority. The form name field F32 stores strings f half-width characters representing form names, and the control name field F33 stores strings of half-width characters representing control names. The user group field F34 is provided for each use group, namely developer, production, maintenance, useradmin, manager, operator, user1, user2 and the like, and stores one of either of two setting values representing enable and disable. The setting value "enable" represents that using the function is authorized, and the setting value "disable" represents that using the function is not authorized.

The reading apparatus 41e is configured by a floppy disk drive, CD-ROM drive, DVD-ROM drive or the like, and is capable of reading computer programs and data recorded on a portable storage medium 44. The portable storage medium 44 stores a server program 44a that allows a computer to functions as the authentication server, such that the computer reads the server program 44a from the portable storage medium 44, and installs the server program 44a on the hard disk 41d.

The server program 44a can not only be provided by the portable storage medium 44, it may also be provided over an electric communication line from an external apparatus connected to the computer so as to be capable of communication by means of the electric communication line (either wired connection, or wireless). For example, the server program 44a may be stored on the hard disk of a server computer connected to the interne, such that the computer can access the server computer and download the server program 44a, which can then be installed on the hard disk 41d The server program 44a performs user authentication when a user logon request is received from the client computer 3, and acquires information relating to user use authority of the application program 34a from the database DB2 and transmits this information to the client computer 3 when the user has been successfully authenticated. The content of this process is described later.

The I/O interface 41f may be configured by, for example, a serial interface such as a USB, IEEE1394, RS-232C or the like, a parallel interface such as a SCSI, IDE, IEEE1284 or the like, or an analog interface such as a D/A converter or A/D converter. The I/O interface 41f is connected to an input unit 43, which includes a keyboard and mouse, such that data can be input to the authentication server 4 when a user, such as systems operator or the like, uses the input unit 43.

The communication interface 41g may be, for example, an Ethernet (registered trademark) interface, such that the authentication server 4 can send and receive data to and from the client computer 3 connected to a communication network NW by using a predetermined communication protocol through the communication interface 41g.

The image output interface 41h is connected to an image display unit 42 such as an LCD, CRT or the like, such that image signals corresponding to the image data obtained from the CPU 41a can be output to the image display unit 42. The image display unit 42 displays images (screens) in accordance with the input image signals.

Figure 10:
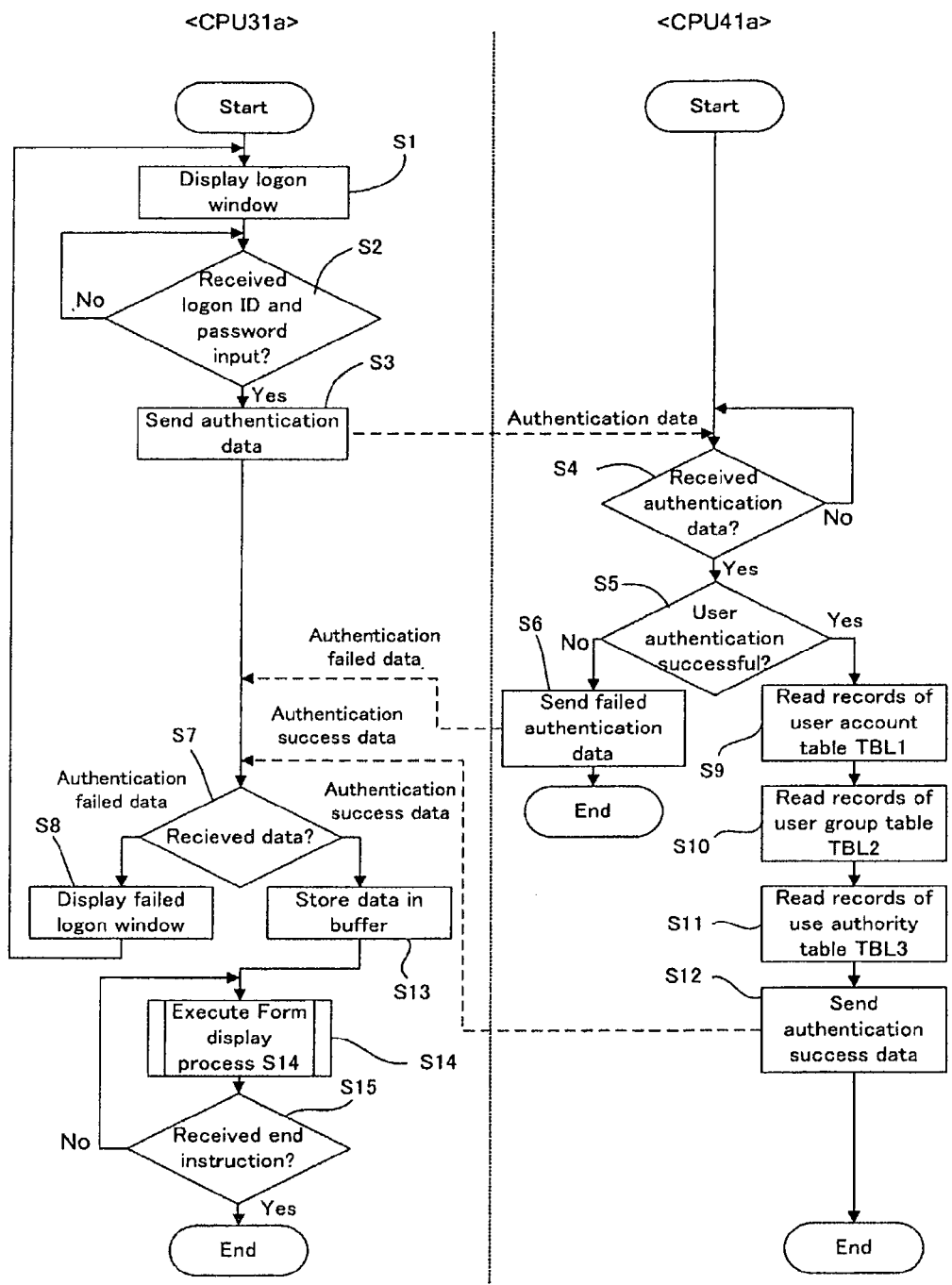
FIG. 10 is a flow chart showing the processing sequence of the application program of an embodiment of the present invention.

The operation of the authentication system 1 of the embodiment of the present invention is described below. A user operates the input unit 33 of the client computer 3 to issue an instruction to start the application program 34. The CPU 31a receives the instruction and loads the application program 34a into the RAM 31c. FIG. 10 is a flow chart showing the processing sequence of the application program of an embodiment of the present invention. First the CPU 31a displays the logon window on the image display unit 32 (step S1). The logon window is provided with an input area for entering a logon ID and password; the user moves the cursor to the input area and enters her logon ID and password (not shown in the drawing). When the CPU 31a has received the input user ID and password (step S2: YES), authentication data including the logon ID and password are sent to the authentication server 4 through the communication interface 31g (step S3) to request user authentication.

When the CPU 41a of the authentication server 4 has received the authentication data through the communication interface 41g (step S4: YES), the user account table TBL1 is referenced in the database DB2, and user authentication is accomplished by determining whether or not the account has recorded the logon ID and password included in the authentication data, whether or not the account is effective, and whether or not the expiration date has elapsed (step S5). The concrete examples of FIGS. 7~9 pertain to when the user "supervisor" logs on. When "administrator" is input as the logon ID and "22222" is input as the password, [administrator] and [22222] are included as the login ID and password in the authentication data sent from the client computer 3 to the authentication server 4. The logon ID and password match the logon ID and password for the user account "supervisor" stored in TBL1. Furthermore, "enable", which represents validity, is stored in the account validity field of this account, and no expiration date is set. Therefore, the user authentication is successful in this case.

When the user authentication is unsuccessful (step S5: NO), the CPU 41a transmits unsuccessful authentication data representing authentication failure to the client computer 3 (step S6). When the CPU 31a of the client computer 3 has received the unsuccessful authentication data (step S7: [authentication failed data]), a failed login window indicating unsuccessful login is displayed (step S8), and the process returns to step S1.

When the user authentication has succeeded in step S5 (step S5: YES), the CPU 41a reads each record of the user in the user account table TBL1 (step S9), and the user group name is used as a search key to search the user group table TBL2 and read each record of the user group (step S10), and the user group name is used as a search key to search the use authority table TBL3 and read the use authority data of each controls related to this user group (step S11). When the user is "supervisor", each record related to this account is read from the user account table TBL1, that is, the login ID [administrator], user name [supervisor], user group name [useradmin], password [22222], default database [db¥sample.rbk], account validity [enable], record date [2004/10/01], expiration date [ ] (no record), change date [ ] (no record), recorder [system], and description [first record] are read. Furthermore, all records of the user group name [user admin] are read from the user group table TBL2, that is, user group ID [4], user group name [user admin], user group display name [supervisor], use authority ID [4], validity [YES], recorder name [system], record date [2004/10/01], description [first record] are read; and all records of the user group name [useradmin] are read from the use authority table TBL3, that is, use authority [enable] corresponding to form name [formMain] and control name [mnuFile], and use authority [enable] corresponding to form name [formMain] and control name [mnuRBK] are read.

Then, the CPU 41a sends the successful authentication data including the data read from the user account table TBL1, user group table TBL2, and use authority table TBL3 of the database DB2 to the client computer 3 (step S12).

When the CPU 31a of the client computer 3 has received the successful authentication data (step S7: [successful authentication data]), data related to the user account included in the successful authentication data, data related to the user group, and data related to the use authority are stored in a buffer area in the RAM 31c (step S13). Then, the CPU 31a executes the form display process described below (step S14).

Figure 11:
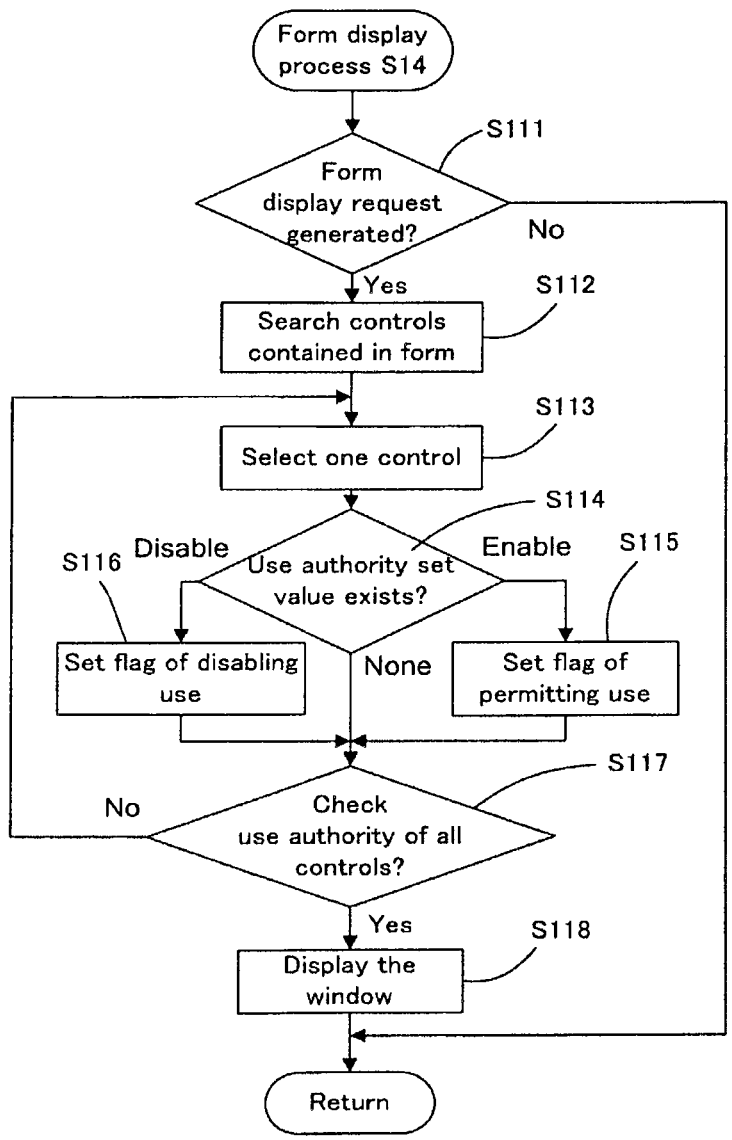
FIG. 11 is a flow chart showing the processing sequence of the form display process.

FIG. 11 is a flow chart showing the processing sequence of the form display process of step S14. In the form display process S14, the CPU 34a first determines whether or not a form (window) display request has occurred (step S111). After successful logon, a main window display request is generated. Furthermore, this window display request is also generated when the user clicks on a menu command or icon or the like in the main window or another window to change the display to another window. In this way when a window display request is generated (step S111: YES), the CPU 31a searches the control included in the window (step S112), selects one control from among the controls of the search result (step S113), and references the use authority data stored in the buffer area to check the set value of the use authority of this control (step S114). When use is authorized, that is, when the use authority set value is [enable] (step S114: [enable]), the CPU 34a sets the flag permitting use of this control (step S115), and when use is not authorized, that is, when the use authority set value is [disable] (step S114: [disable]), the flag disabling use of the control is set (step S116). Furthermore, when there is no use authority set (step S114: [none]), the CPU 31a does not set a flag for this control. That is, the default condition is maintained. Then, the CPU 31a determines whether or not use authority have been checked for all controls of the search result (step S117), and when there is a control that has not been checked (step S117: NO), the CPU 31a returns the process to step S113. When the use authority check has been completed for all controls in step S117 (step S117: YES), the CPU 31a displays the window for which the display request was generated (step S118), and the routine returns. Furthermore, when a form display request is not generated in step S111 (step S111: NO), the CPU 31a returns the process.

Figure 12:
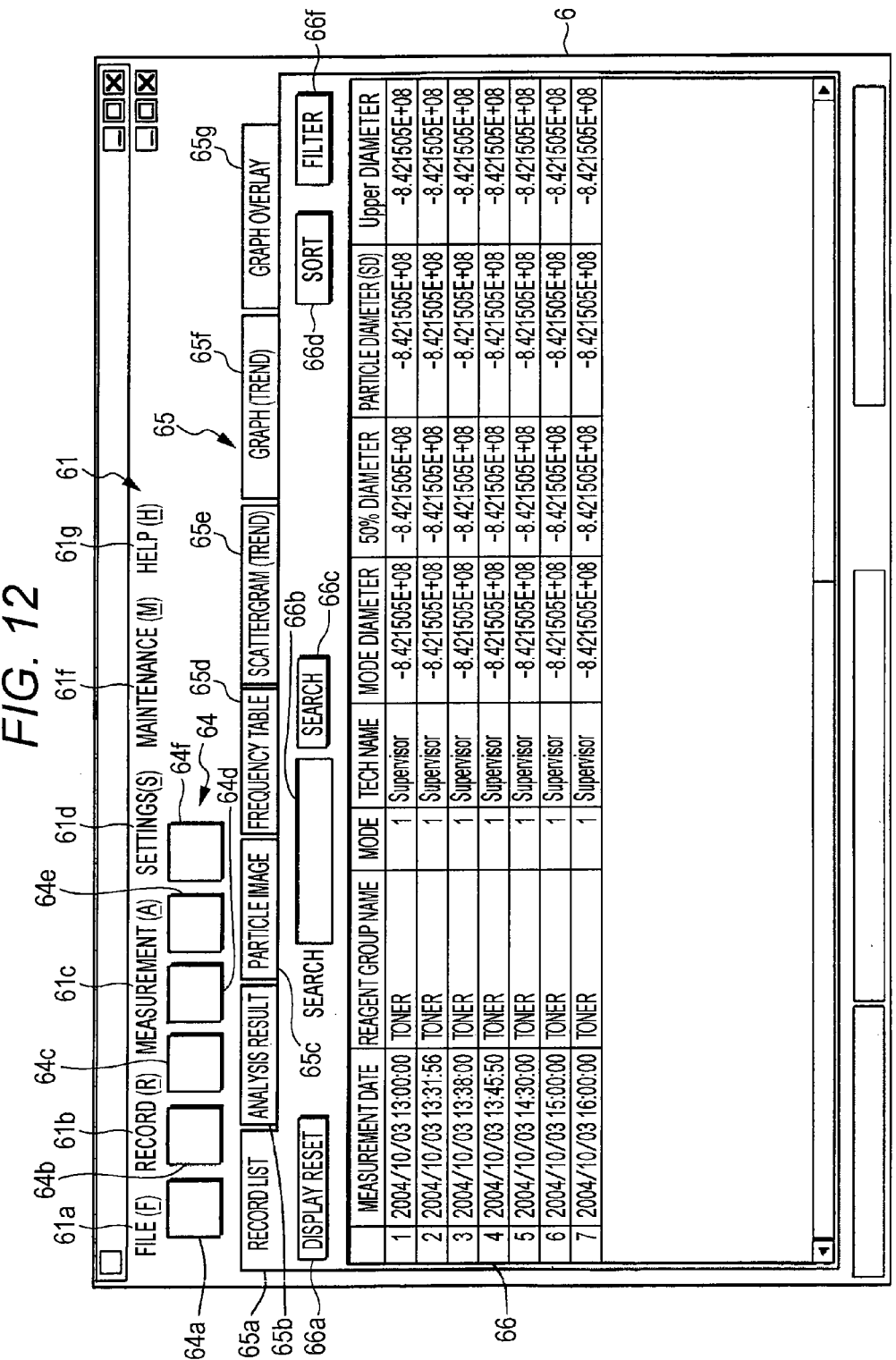
FIG. 12 shows an example of a main window.

An example of the main window display of the form display process S14 is described below. FIG. 12 shows an example of a main window. A menu bar 61 is provided in the uppermost section of the main window 6; the menu bar 61 is provided with an array including a file menu 61a, record menu 61b, measurement menu 61c, setting menu 61d, maintenance menu 61f, and help menu 61g. The file menu 61a includes commands related to file operations; clicking on the file menu 61a displays an array of pull-down commands. This condition is shown in FIG. 13. The commands in the file menu 61a include a [new] command 62a for creating a record book to store new measurement results, [open] command 62b for reading a record book stored in the database DB1, [print] command 62c for printing data displayed in the window 6, and [end] command 62d for closing the application program 34a. The file menu 61a also includes an external save menu 62 as a sub menu. The sub menu 62e includes an [all records] command 63a for saving all records of the currently open record book to another record book, and a [select record] command 63b for saving a selected record to another record book; when the cursor is pointed at the external save menu 62e, the commands 63a and 63b are displayed in an array.

Furthermore, the record menu 61b includes commands for validating data and the like, and the measurement menu 61c includes commands for setting measurement conditions, specifying the start of measurement and the like (not shown in the drawing). The setting menu 61d includes commands for settings of the particle measuring apparatus 2, and display settings, the maintenance menu 61f includes commands for specifying the start of the automatic cleaning sequence of the particle measuring apparatus 2, specifying the start of the part replacement sequence, specifying the start of the various adjustment sequences and the like, and the help menu 61g includes commands for showing the online manual of the application program 34a and the like (not shown in the drawing).

A tool bar 64 is provided below the menu bar 61. A plurality of icons 64a~64f are aligned on the tool bar 64. The icon 64a is allocated to the [new] command 62a, such that when the icon 64a is clicked, the command 62a is executed in the same manner as when the [new] command 62a is selected from the file menu 61a. The icon 64b is allocated to the [open] command 62b, the icon 64c is allocated to the [all records] command 63a, and the icon 64d is allocated to the [print] command 62c. Furthermore, although not described in detail, the icon 64e is allocated to a command for displaying a measurement conditions dialog, and the icon 64f is allocated to a command for displaying a maintenance sequence execution dialog.

A measurement result display region 65 is provided below the tool bar 64. At the top of this measurement result display region 65 are provided seven tabs including a record list tab 65a, analysis result tab 65b, particle image summary tab 65c, frequency table tab 65d, scatter tab 65e, graph tab 65f, and graph overlay tab 65g. When the record summary tab 65a is selected by being clicked, a record list 66 of the past measurement results of this user is read from the database DB1 and displayed in the measurement result display region 65. The condition of the selected record summary 65a is the default condition. That is, when the main window 6 is displayed, in order to standardize the display the record summary 66, the CPU 31a references the default database data stored in the buffer area of the database DB1, accesses these data and reads the past measurement results of this user, then generates and displays a record list.

At the top of the record summary 66 are provided a display reset button 66a, search text input box 66b, search button 66c, sort button 66d, and filter button 66f. When the display reset button 66a is clicked, the display returns to the initial measurement sequence display. Furthermore, when the search button 66c is clicked after a text string has been entered in the search text input box 66b, a text matching the input text string is searched from the record list 66. When the sort button 66d is clicked, a dialog for setting the sort conditions is displayed (not shown in the drawing), and then the data displayed in the record list 66 is sorted according to the set conditions. When the filter button 66f is clicked, a dialog for setting the filter conditions is displayed (not shown in the drawing), and then the data displayed in the record list 66 is filtered according to the set conditions.

Although not shown in the drawings so as to simplify the description, when the analysis result tab 65b is clicked, the parameters of histograms and scattergrams related to the shape of particles, that is, particle roundness and circular diameter, are displayed in the measurement results display area 65. In this display mode, various parameters can be selected, and the histograms and scattergrams of the selected parameters are displayed. When the particle image list tab 65c is clicked, the partial images corresponding to the measurement results selected in the record list 66 are displayed in the measurement results display area 65. When the frequency table button 65d is clicked, a particle diameter frequency table, roundness frequency table, and scatter frequency table of the measurement results selected in the record list 66 are displayed in the measurement result display area 65. When the scatter tab 65e is clicked, a scattergram of the data displayed by the analysis result tab is displayed in the measurement result display area 65. When the graph tab 65f is clicked, a trend graph of the parameter (hereinafter referred to as particle diameter parameter) related to particle diameter of the selected by the analysis result tab, and a trend graph of the parameter (hereinafter referred to as particle shape parameter) related to particle shape are respectively displayed in the measurement result display area 65. When the graph overlay tab 65g is clicked, an overlay graph of the particle shape parameter and particle diameter parameter selected by the analysis result tab is displayed in the measurement result display area 65.

Figure 14:
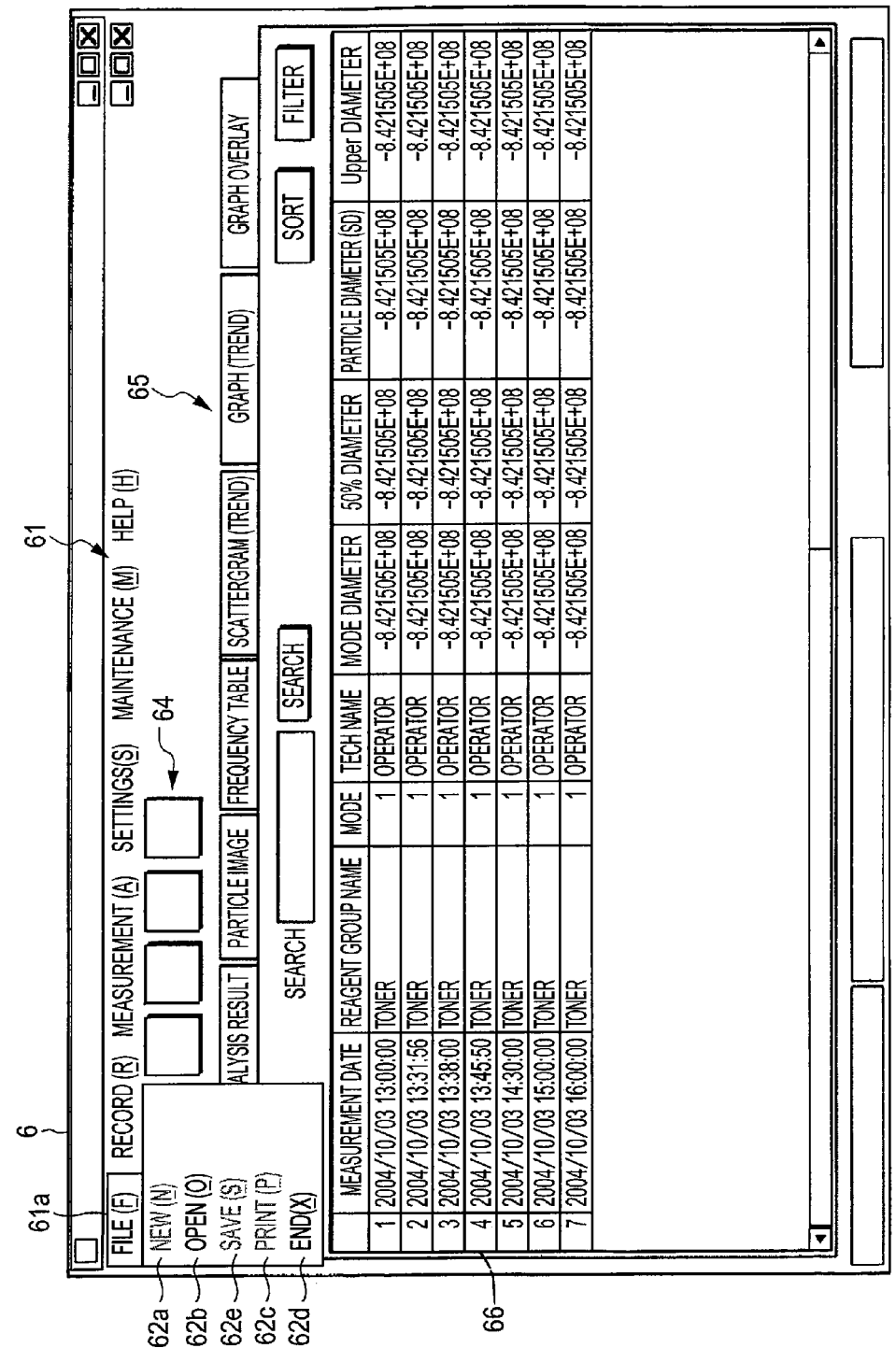
FIG. 14 shows an example of a main window.

The file menu 61a, record menu 61b, measurement menu 61c, setting menu 61d, maintenance menu 61f, help menu 61g, commands 62a~62d, external save menu 62e, commands 63a and 63b, commands included in the menus 61b, 61c, 61d, 61f, and 61g, icons 64a~64f, record summary tab 65a, analysis result tab 65b, particle image summary tab 65c, frequency table tab 65d, scatter tab 654, graph tab 65f, graph overlay tab 65g, display reset button 66a, search text input box 66b, search button 66c, sort button 66d, and filter button 66f are all controls. Therefore, these controls are obtained as search results when the main window 6 is displayed. The CPU 34a confirms the set values of the use authority of these controls, and sets the enable and disable flags. When the enable flag is set, these controls are displayed in a normal color (dark color), and when the disable flag is set, these controls are displayed in a light color. FIG. 14 shows the main window when only commands 62b and 62d are enabled among the commands included in the file menu 61a. In this way the commands, menus, and icons displayed in light colors cannot be used and do not response to a user mouse click. A request to display another window is generated when the user clicks on a file menu, icon or the like that is enabled.

After the desired form display process S14 is returned, the CPU 34a determines whether or not an end instruction has been received from the user by the user clicking on the [end] command 62d (step S15). When an end instruction has not been received (step S15: NO), the CPU 34a repeats the execution of the form display process S14. When an end instruction has been received (step S15: YES), the CPU 34a ends the process.

Furthermore, although the authentication system 1 of the present embodiment performs the aforesaid operation, a user group setting operation exists when a user group is set in the database DB2 as one part of this operation. The user group setting operation is described below.

Figure 15:
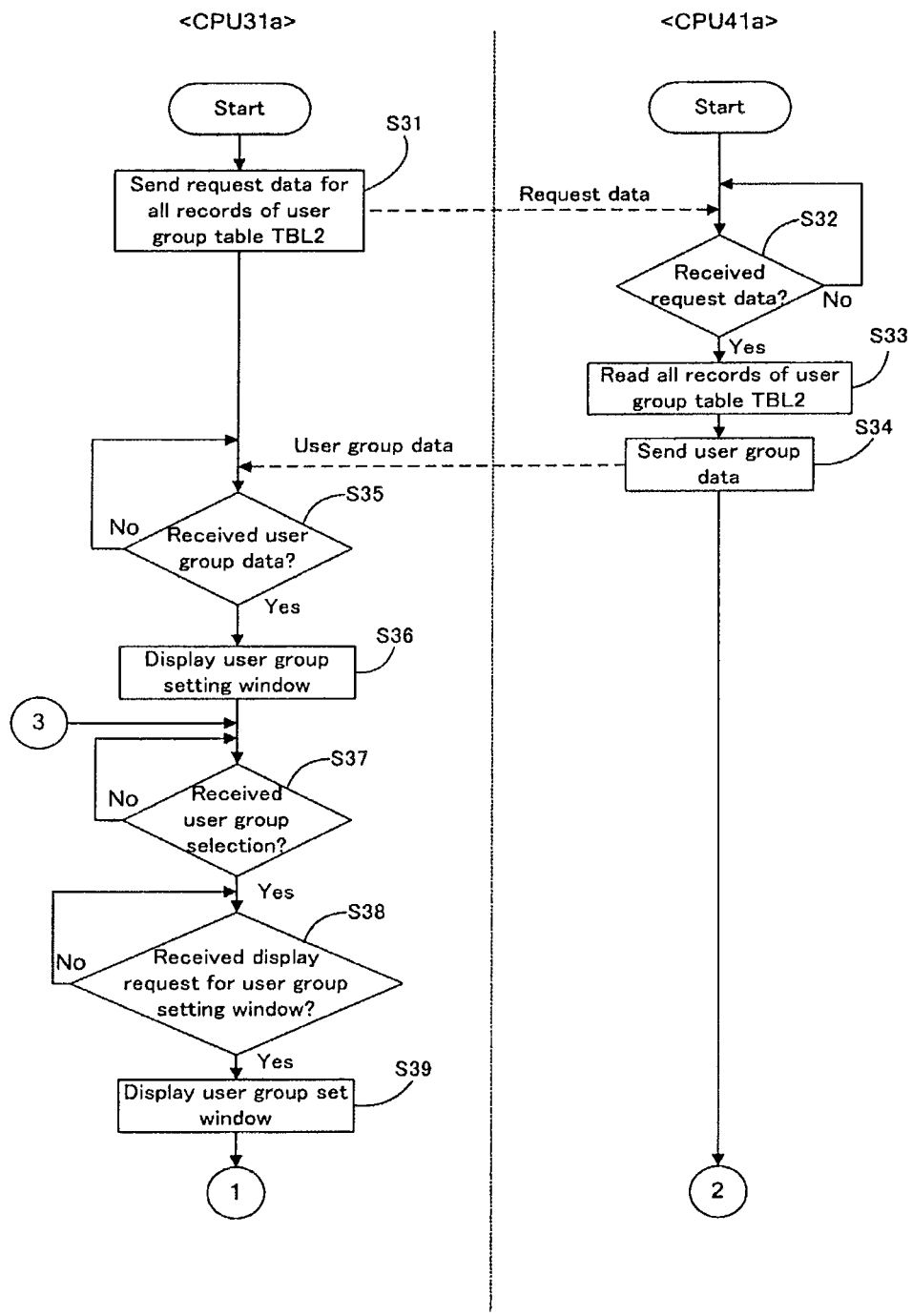
FIG. 15 is a flow chart showing the processing sequence of the user group setting process.
Figure 16:
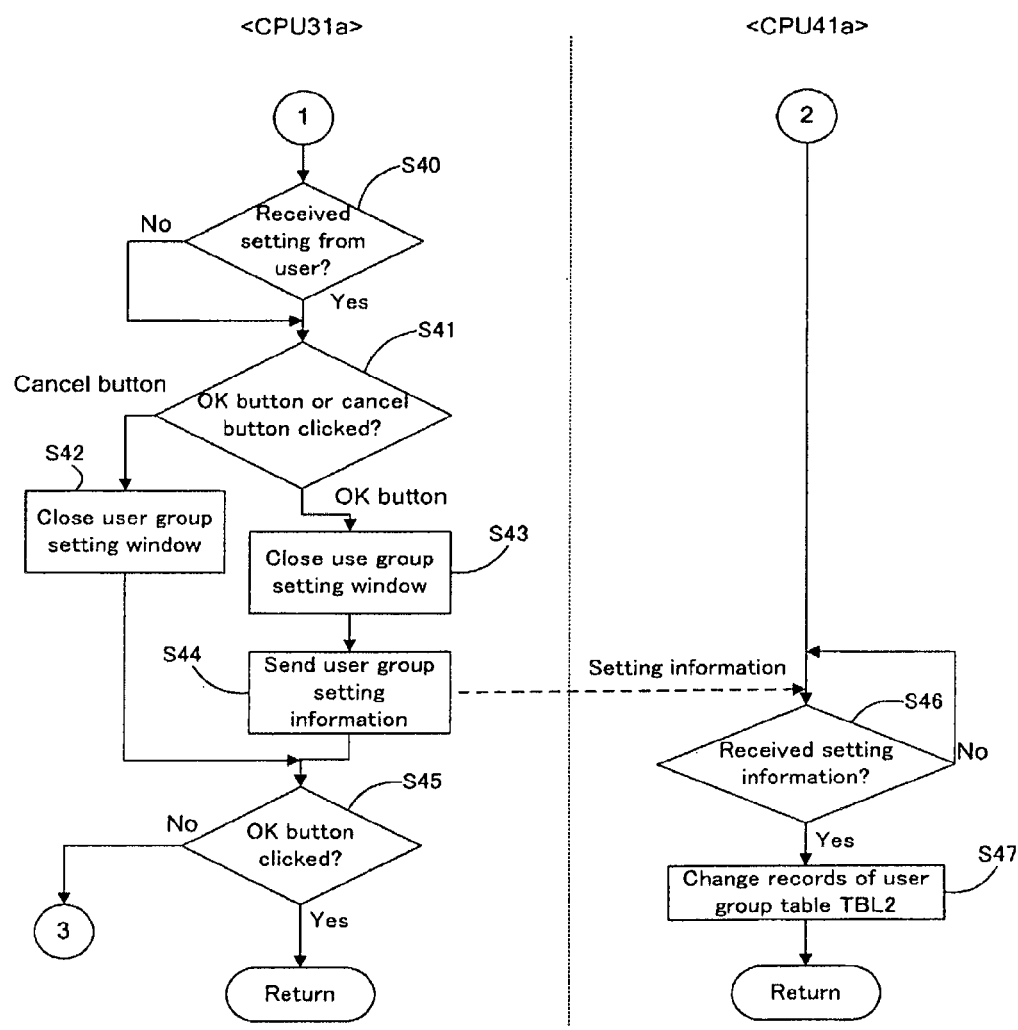
FIG. 16 is a flow chart showing the processing sequence of the user group setting process.

FIGS. 15 and 16 are flow charts showing the processing sequence of the user group setting process. The user group setting process is executed during the process described in FIGS. 10 and 11. The user group setting process only enables management user groups such as manager and maintenance. First, the user displays the main window 6, and clicks on the user authentication setting command included in the setting menu 61d. In this way a display request is generated for the user authentication setting window. When a user authentication setting window display request has been received, the CPU 31a sends all records of requested data in the user group table TBL2 to the authentication server 4 (step S31). When the requested data have been received (step S32: YES), the CPU 41a of the authentication server 4 reads all data of the user group table TBL2 (step S33), and sends the user group data to the client computer 3 (step S34). When the CPU 31a of the client computer 3 has received the user group data (step S35: YES), the user authentication setting window is displayed (step S36).

FIG. 17 shows an example of the user authentication setting window. The user authentication setting window 7 is provided with a user information tab 71a, password tab 71b, and group setting tab 71c. When the user information tab 71 is selected, information (assigned user group, logon ID, user name, default database, expiration date and the like) related to each user recorded in the user account table TBL1 is displayed (not shown in the drawings). Furthermore, processes for user registration, user editing, and changing the content of the database DB2 can be performed from the user authentication tab 71a. When the password tab 71b is selected, screens are displayed allowing the automatic lockout time to be set, the password expiration date to be set and the like (not shown in the drawings). When the group setting tab 71c is selected, the window shown in FIG. 17 is displayed.

The group setting tab 71c includes a group list 72a for displaying each user group name, user group validity information, recorder name, change date, and description in list format, and access permission list 72b for displaying the accessibility of each function of the application program 34a for each user group selected by the group list 72a. Furthermore, an edit button 72c is provided within the group setting tab 71c, and an OK button 73 is provided below the group setting tab 71c.

The CPU 31a determines whether or not a user group has been selected from the group list 72a (step S37), and determines whether or not a user group setting window display request has been generated (step S38). The user group setting window display request is generated by clicking on the edit button 72c. When a user group selection has been received (step S37: YES) and a user group setting window display request has been received (step S38: YES), the CPU 31a displays the user group setting window (step S39).

FIG. 18 shows an example of the user group setting window. The user group setting window 8 includes an input box

81 for entering the user group name and user group display name, radial buttons 82*a* and 82*b* for setting user group enable and disable, use authority list 83 for setting the use authority for functions, OK button 84 to confirm settings, and cancel button 85 for canceling settings. The use authority list 83 further includes each control display name 83*a*, and checkbox 83*b* that is checked when use is authorized displayed in list format.

The CPU 31*a* receives the settings from the user (step S40). The user can input a group name in the input box 81, and set the user group to enable or disable by operating the input unit 33. Furthermore, the use authority of control can be set by clicking the checkbox 83*b* adjacent to the control display name 83*a*. The CPU 31*a* determines whether or not either of the OK button 84 and cancel button 85 has been clicked (step S41). When the cancel button 85 has been clicked (step S41: [cancel]), the CPU 31*a* closes the user group setting window 8 (step S42). Furthermore, when the OK button 84 is clicked (step S41: [OK]), the user group setting window 8 is closed (step S43), and the user group setting information is sent to the authentication server 4 (step S44). Then, the CPU 31*a* determines whether or not the OK button 73 has been clicked (step S45), and when the OK button 73 has not been clicked (step S45: NO), the process returns to step S37. The user can then set the use authority for another user group. Furthermore, when the OK button 73 has been clicked (step S45: YES), the CPU 31*a* returns the process.

When the user group setting information has been received (step S46: YES), the CPU 41*a* of the authentication server 4 changes the record of the user group table TBL2 according to the set conditions (step S47). The CPU 41*a* returns the process.

According to this construction, the use restrictions of the application program functions can be changed by simply changing the user group authority information stored in the database DB2 without changing the program code of the application program, thereby largely eliminating the work necessary to effect such a change by the conventional art.

Furthermore, since the enabled use restrictions are determined for each control by searching the controls included in the window before the window is displayed, use restrictions can be set for only the controls required in the displayed window, and the window reflecting these controls can be more effectively displayed.

The aforementioned structure for setting the use restrictions of the controls of the window system provides the following benefits. In window systems such as Windows produced by Microsoft Corporation, systems controlled by graphical user interface (GUI) components configuring the screen, such as buttons, scroll bars, list boxes, menus (pull down menu/pop up menu) and the like configuring the window are standard. Since this control is an object related to user input and output, use restrictions are sufficient if set only for this control, and it is not necessary to set use restrictions for objects that cannot be directly accessed by the user. Accordingly, use restrictions for functions of the application program directly used by the user can be set by the aforesaid structure, which allows use restrictions to be set for each control. Setting the use of each control to enabled or disabled by setting use restrictions for the control can be easily realized just by setting a flag provided in the API of the window system.

Since the controls included in the window are searched when the application program window is opened or refreshed, use restrictions are only set for controls included in the newly opened or refreshed window, and use restrictions are not set for other controls that are not being used at that time, such that setting of use restrictions is efficiently accomplished.

Communication efficiency is improved and the process load is reduce on the authentication server because data relating to the user account downloaded from the authentication server 4, and data relating use authority are stored in a temporary buffer area, and thereafter the data are used by referencing the local buffer area without accessing the authentication server 4.

Since a client computer 3 and authentication server 4 are provided and connected so as to be capable of data communication by a communication network NW, the number of client computers can be easily increased, such that user authentication inquiries can be sent to a single (or plurality) authentication server 4 from various client computers. In this case, the accounts used by each client computer should be in common to the computers, such that a single user can use any client computer by logging on to the authentication server from a single user account. In this way the complex labor of using a different user account for each client computer is eliminated, and produces a user friendly system.

Furthermore, since the authentication server is provided with databases, the authentication server can acquire use authority information from the database at essentially the same time as user authentication. The amount of communication data is also reduced compared to when the authentication server program and databases are installed on different computers and the authentication server accesses the databases over a communication network.

Since use authority are set for each user group, the recording of the use authority is readily accomplished by just recording the user group to which a user belongs insofar as use authority have been recorded for the user group, without separately recording use authority for each user. Since use authority is managed only for user groups, the management of use authority is easily accomplished.

A client computer connected to a particle measuring apparatus 2 and a different measuring apparatus, such as, for example, a blood analyzer, may also be connected to the authentication server in addition to the client computer 3 of the present embodiment. In this case, the application program installed on the client computer connected to another measuring apparatus may be different from the application program 34*a* of the present embodiment, and a use authority table corresponding to the application program of the other measuring apparatus, which is different from the use authority table TBL3, may be correspondingly provided on the authentication server 4. In this case, when authentication data are sent from each client computer to the authentication server 4, or with a different timing, specific information specifying the use authority table corresponding to the installed application program is sent to the authentication server 4, and the use authority table corresponding to the various application programs may be specified to the authentication server 4 by the specifying information. In this way use authority information corresponding to an application program can be downloaded to a client computer.

Although a client computer 3 and authentication server 4 are provided separately and connected so as to be capable of data communication in the present embodiment, the present invention is not limited to this arrangement inasmuch as the application program, authentication server program of the authentication server 4, and databases DB1 and DB2 may be installed on one computer connected to a measuring apparatus. This arrangement can be used, for example, with a single measuring apparatus, so as to effectively reduce the system structure when the addition of new measuring apparatuses later is not anticipated.

Although the user account table TBL1, user group table TBL2, and use authority table TBL3 have been described as being provided on a single authentication server 4, the present invention is not limited to this arrangement inasmuch as the various tables (databases) may be installed on separate computers to distribute processing.

The foregoing detailed description and accompanying drawings have been provided by way of explanation and illustration, and are not intended to limit the scope of the appended claims. The foregoing detailed description and accompanying drawings have been provided by way of explanation and illustration, and are not intended to limit the scope of the appended claims. Many variations in the presently preferred embodiments illustrated herein will be obvious to one of ordinary skill in the art, and remain within the scope of the appended claims and their equivalents.

What is claimed is:

1. A method for modifying use authority of a user for a system which comprises a measurement apparatus configured to measure a sample, a client computer on which an application program used for processing measurement results of the measurement apparatus is installed, and an authentication server arranged in a place different from a facility where the measurement apparatus is arranged, the method comprising steps of:
   receiving, by the client computer, input of authentication information used to authenticate a user;
   sending the input authentication information from the client computer to the authentication server;
   authenticating, by the authentication server, a user based on the authentication information sent from the client computer;
   when a user authentication is successful, acquiring, by the client computer, use authority information related to the authenticated user from a database of the authentication server, wherein the application program comprises a plurality of objects, and the database stores use authority information which defines use authority to a use objects for each of the plurality of objects;
   setting, by the client computer, use restrictions of the application program for the authenticated user based on the acquired use authority information;
   when the acquired use authority information indicates that the authenticated user is allowed to use one of the plurality of objects for modifying the use authority information stored in the database, receiving, by the client computer, an instruction to modify the use authority information stored in the database;
   sending the instruction from the client computer to the authentication server; and
      modifying, by the authentication server, the use authority information stored in the database according to the instruction received from the client computer.

2. The method of claim 1, wherein
   the step of setting use restrictions of the application program comprises steps of:
      searching objects configuring the application program;
      determining whether or not the authenticated user is allowed to use the searched objects based on the use authority information acquired from the authentication server; and
      setting an object as non-usable when it has been determined the user does not have use authority of the object.

3. The method of claim 1, wherein
   the database stores first information including a user group associated with a user, and a second information including use authority information associated with a user group, and
   the authentication server modifies the use authority information included in the second information.

4. A system, comprising:
   a measuring apparatus arranged in a facility and configured to measure a sample;
   a client computer arranged in the facility, and comprising a first memory under control of a first processor, the first memory storing an application program used for processing measurement results of the measuring apparatus; and
   an authentication server arranged at a place different from the facility, and comprising a second memory under control of a second processor, wherein
   the first processor performs operations comprising:
      receiving input of authentication information used to authenticate a user;
      sending the authenticated information to the authentication server;
      when a user authentication by the authentication server is successful, acquiring use authority information related to the authenticated user from the database of the authentication server, wherein the application program comprises a plurality of objects, and the database stores user authority information which defines a use authority for each of the plurality of objects;
      setting use restrictions of the application program for the authenticated user based on the acquired use authority information;
      when the acquired use authority information indicates that the authenticated user is allowed to use one of the plurality of objects for modifying the use authority information stored in the database, receiving an instruction to modify the use authority information stored in the database; and
      sending the instruction to the authentication server, wherein
   the second processor modifies the use authority information stored in the database according to the instruction received from the client computer.

5. The system of claim 4, wherein
   the first processor performs operations comprising:
      searching objects configuring the application program;
      determining whether or not the authenticated user is allowed to use the searched objects based on the use authority information acquired from the authentication server; and
      setting an object as non-usable when it has been determined the user does not have use authority of the object.

6. The system of claim 5, wherein
the object is a control in a window system.

7. The system of claim 6, wherein
the first processor searches a control included in a window when the window is opened or changed in the application program.

8. The system of claim 4, wherein
   the database stores first information including a user group associated with a user, and a second information including use authority information associated with a user group, and the second processor modifies the use authority information included in the second information.

* * * * *